(12) United States Patent
    Mizani Oskui

(10) Patent No.: US 8,380,129 B2
(45) Date of Patent: Feb. 19, 2013

(54) CONTACTLESS READER FOR MOBILE PHONE FOR ONLINE ELECTRONIC TRANSACTION

(76) Inventor: Ali Mizani Oskui, Tehran (IR)

( * ) Notice: Subject to any disclaimer, the term of this patent is extended or adjusted under 35 U.S.C. 154(b) by 0 days.

(21) Appl. No.: 13/098,494

(22) Filed: May 2, 2011

(65) Prior Publication Data

US 2012/0064864 A1 Mar. 15, 2012

Related U.S. Application Data

(60) Provisional application No. 61/371,710, filed on Aug. 8, 2010.

(51) Int. Cl.
*H04W 4/00* (2009.01)
*H04W 4/20* (2009.01)
*H04W 56/00* (2009.01)

(52) U.S. Cl. .......... 455/41.2; 455/414.1; 455/41.3; 705/16; 705/39; 705/44; 705/64

(58) Field of Classification Search .......... 455/406–411, 455/414.1, 41.1–41.3; 705/44, 64, 66, 39–41, 705/16, 75, 77–79
See application file for complete search history.

(56) References Cited

U.S. PATENT DOCUMENTS

| | | | |
|---|---|---|---|
| 2005/0177494 A1* | 8/2005 | Kelly et al. | 705/39 |
| 2007/0095892 A1* | 5/2007 | Lyons et al. | 235/379 |
| 2007/0116292 A1* | 5/2007 | Kurita et al. | 380/270 |
| 2009/0309666 A1* | 12/2009 | Sun et al. | 331/44 |

* cited by examiner

*Primary Examiner* — Ajit Patel
*Assistant Examiner* — Erica Navar
(74) *Attorney, Agent, or Firm* — Barry Choobin; Choobin & Choobin Consultancy

(57) ABSTRACT

The various embodiments herein provide a Mobile Phone Contactless Reader (MCR) for reading a unique mobile subscriber identification number (UMSIN) associated with Subscriber Identity Module card of the mobile phone. The MCR includes a Central Processing Unit (CPU), a receiving unit for scanning communication waves on a Broadcast Control Channel (BCCH) broadcasted by a Base Transceiver Station, a memory unit for storing and updating the continuously scanned communication waves. A frequency meter counts the scanned communication waves and measures frequency of proximal communication wave. Further a transmitting unit transmits one of the UMSIN to a transaction unit. The mobile station provides the UMSIN to the MCR. The announced UMSIN is transferred to one of a bank account and a Universal Mobile Money database through the transaction unit for online mobile transactions.

17 Claims, 6 Drawing Sheets

CONTACTLESS READER FOR MOBILE PHONE FOR ONLINE ELECTRONIC TRANSACTION

CROSS-REFERENCE TO RELATED APPLICATIONS

This application claims the benefit of U.S. provisional patent application Ser. No. 61/371,710, filed on Aug. 8, 2010, which is incorporated herein by reference in its entirety.

BACKGROUND

1. Technical Field

The embodiments herein generally relates to a mobile phone. The embodiments herein particularly relate to a Mobile Phone Contactless Reader (MCR) and more particularly relates to performing a secure electronic transaction between the mobile phone and a Payment service provider using the MCR.

2. Description of the Related Art

Presently different kinds of credit cards and electronic identity cards are issued in the world and are widely used for online transaction purposes. The credit cards and the electronic identity cards are of different kinds such as barcode cards, magnetic cards, contact and contactless cards with chip and the like. Various enterprises such as insurance companies and banks, time and attendance companies, telecommunication companies (telephone cards), bus and metro companies (electronic tickets) issues the electronic identity cards for identification and execution of the financial operations between a customer and the companies. However the electronic cards and credit cards come with various defects such as variety of the cards cause confusion among the customers. Also carrying multiple cards becomes tedious and further the customer may forget to carry multiple cards all time.

The currently existing cards especially the banking magnetic cards often used by the customers involve low security. The usage of cards require either one of electronic terminals or banking POS (Point Of Sale) which are absent at certain locations. Moreover, production and issuance of the cards are expensive and issuance of the credit card requires the customers to open a bank account accordingly. Furthermore payments of bus fare, metro fare and taxi fare using the cards becomes difficult considering the time consumption involved in payment process by banking credit cards and a single credit fails to serve purpose of its usage all across the globe.

Yet in another scheme the mobile phones are provided with contactless cards or a kind of contactless tag. Also some banks stick their credit cards in the form of contactless tag on the body of mobile phone of the customers and use a normal contactless card reader on the POS for identifying the customers. However, such scheme needs an additional part on the mobile phone. Moreover providing the mobile phone along with contactless cards and tags do not differentiate with providing credit cards since the contactless cards or the tags needed great level of management and is expensive.

In light of foregoing discussion there exists a need to provide a Mobile Phone Contactless Reader (MCR) for reading a unique mobile subscriber identification number associated with Subscriber Identity Module (SIM) card of the mobile phone. Also there exists a need to provide the MCR which is connected to various transaction units associated with various Payment Service Providers (PSPs) for online mobile transactions. Further, there exists a need to convert the mobile phone into one of an electronic identification card or a credit card for online mobile transactions across globe.

The abovementioned shortcomings, disadvantages and problems are addressed herein and which will be understood by reading and studying the following specification.

OBJECTS OF THE EMBODIMENTS

The primary object of the embodiments herein is to provide a Mobile Phone Contactless Reader (MCR) for reading a unique mobile subscriber identification number associated with Subscriber Identity Module (SIM) card of the mobile phone.

Another object of the embodiments herein is to provide a MCR which is adapted to be connected to various transaction units associated with various Payment Service Providers (PSPs) for online mobile transactions.

Yet another object of the embodiments herein is to provide a MCR to convert the mobile phone into one of an electronic identification card or a credit card for online mobile transactions across globe.

Yet another object of the embodiments herein is to provide a MCR for reading a unique mobile subscriber identification number associated with Subscriber Identity Module (SIM) card of the mobile phone to reduce expenses incurred by issuance of various types of credit cards and electronic identity cards to customers.

Yet another object of the embodiments herein is to provide a MCR allowing fast connection between transaction unit and one of a bank account database or a Universal Mobile Money (Ummoney) database for online mobile transactions.

Yet another object of the embodiments herein is to provide a MCR communicating with a mobile device being secure in comparison with usage of electronic identity cards and credit cards.

Yet another object of the embodiments herein is to provide a MCR communicating with a single mobile device for online mobile transactions with various payment services for various online transactions.

SUMMARY

These and other objects and advantages of the present disclosure will become readily apparent from the following detailed description taken in conjunction with the accompanying drawings.

The various embodiments herein provide a Mobile Phone Contactless Reader (MCR) for reading a unique mobile subscriber identification number associated with Subscriber Identity Module (SIM) card of the mobile phone for online mobile transactions across globe. The MCR includes a Central Processing Unit (CPU), a receiving unit for continuously scanning communication waves on a Broadcast Control Channel (BCCH). The communication waves are broadcasted by a Base Transceiver Station (BTS). The MCR also includes a memory unit for storing and updating the continuously scanned communication waves. A frequency meter provided in the MCR counts the scanned communication waves and measures frequency of proximal communication wave. The proximal communication wave is associated with a mobile station. Upon stimulation of the frequency meter by the scanned proximal communication wave the measured frequency is communicated to the CPU. Further the MCR includes a transmitting unit for transmitting one of a unique mobile subscriber identification number to a transaction unit. Upon request by the MCR, the mobile station announces the unique mobile subscriber identification number to the MCR. The announced unique mobile subscriber identification number is transferred to one of a bank account or a Universal Mobile Money (Ummoney) database through the transaction unit for online mobile transactions. The frequency meter is provided with logic circuit for counting the scanned communication waves and measuring frequency of the scanned proximal communication wave.

According to one embodiment of the present disclosure herein, the unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone. The transaction unit is associated with a payment service provider. The receiving unit further consists of a Radio Frequency unit (RF) a Demodulator and a Decoder. The transmitting unit further consists of a Radio Frequency unit a Modulator and a Coder. A mobile phone is associated with the mobile station and upon dialing one of a key on the mobile phone the mobile station communicates with an associated BTS on a Random Access Channel (RACH) for further communication with the MCR. The mobile phone is placed at a predefined distance towards the MCR prior to dialing one of the key.

For online transactions, the mobile station requests the MCR through a Random Access Channel (RACH) for allocating a specific channel in order to send the unique mobile subscriber identification number to the MCR. Upon request by the mobile station the frequency meter sends frequency information, timing information and intensity information of the RACH to the CPU of the MCR. Upon receiving the frequency information, the timing information and the intensity information of the RACH by the CPU, the CPU adjusts frequency of the receiving unit to receive the request from the RACH. The MCR allocates a Stand Alone Dedicated Control Channel (SDCCH) to the mobile station based upon the request by the mobile station to receive the unique mobile subscriber identification number. The CPU allocates the SDCCH to the mobile station based on the continuously scanned communication wave information stored in the memory unit. The receiving unit reads the unique mobile subscriber identification number announced by the mobile station.

The MCR directs the mobile station to disconnect communication with the MCR, upon receiving the unique mobile subscriber identification number from the mobile station. The CPU co-ordinates with the transmitting unit to transmit the unique mobile subscriber identification number to the transaction unit. The CPU exchanges information in accordance with communication protocol among the receiving unit, the transmitting unit, the frequency meter and the memory unit. In various embodiments herein, the MCR is one of a Mobile Phone Contactless IMSI (International Mobile Subscriber Identity) Reader (MCIR), a Mobile Phone Contactless TMSI (Temporary Mobile Subscriber Identity) Reader (MCTR), a Mobile Phone Contactless IMEI (International Mobile Equipment Identity) Reader (MCIMR), and a Mobile Phone Contactless MSISDN (Mobile Subscriber ISDN (Integrated Services Digital Network) Number) Reader (MCISDNR).

The various embodiments herein provide an MCR which is adapted to be connected to various transaction units associated with various Payment Service Providers (PSPs) for online mobile transactions. The MCR converts the mobile phone into one of an electronic identification card or a credit card for online mobile transactions across globe. The use of mobile phones in the present disclosure reduces expenses incurred by issuance of various types of credit cards and electronic identity cards to customers. The MCR provides fast communication between transaction unit and one of a bank account or a Universal Mobile Money (Ummoney) database on reception of the unique mobile subscriber identification number, for online mobile transactions. This provides for secure communication of the MCR with the mobile device in comparison with usage of the electronic identity cards and the credit cards by the customers. The usage of the mobile phone in the present disclosure also avoids carrying of one or more of electronic identity cards and credit cards by customers for various online transaction purposes.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
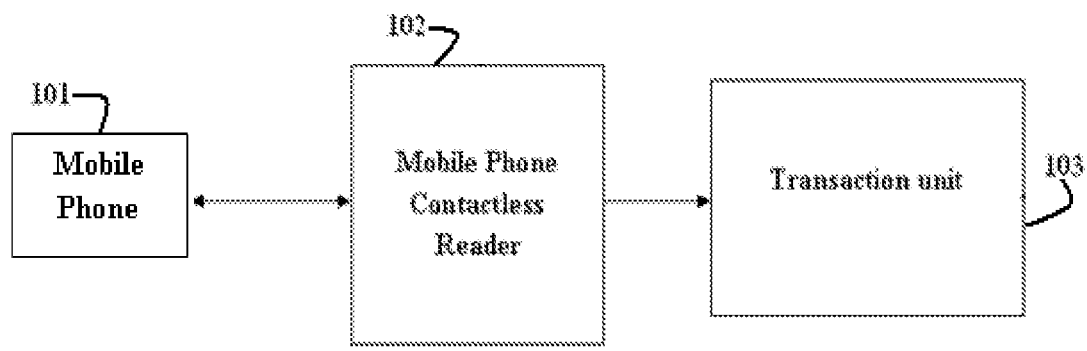
FIG. 1 illustrates a block diagram of a mobile phone connected to a transaction unit through a Mobile phone Contactless Reader (MCR) for online mobile phone transactions according to an embodiment of the present disclosure.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a Mobile Phone Contactless Reader (MCR) for reading a unique mobile subscriber identification number associated with Subscriber Identity Module (SIM) card of the mobile phone for online mobile transactions across globe. The MCR includes a Central Processing Unit (CPU), a receiving unit for continuously scanning communication waves on a Broadcast Control Channel (BCCH). The communication waves are broadcasted by a Base Transceiver Station (BTS). The MCR also includes a memory unit for storing and updating the continuously scanned communication waves. A frequency meter provided in the MCR counts the scanned communication waves and measures frequency of proximal communication wave. The proximal communication wave is associated with a mobile station. Upon stimulation of the frequency meter by the scanned proximal communication wave, the measured frequency is communicated to the CPU. Further the MCR includes a transmitting unit for transmitting one of a unique mobile subscriber identification number to a transaction unit. Upon request by the MCR the mobile station transmits the unique mobile subscriber identification number to the MCR. The announced unique mobile subscriber identification number is transferred to one of a bank account or a Universal Mobile Money (Ummoney) database through the transaction unit for online mobile transactions. The frequency meter is provided with logic circuit for counting the scanned communication waves and measuring frequency of the scanned proximal communication wave.

According to one embodiment of the present disclosure herein, the unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone. The transaction unit is associated with a payment service provider. The receiving unit further consists of a Radio Frequency unit (RF) a Demodulator and a Decoder. The transmitting unit further consists of a Radio Frequency unit a Modulator and a Coder. A mobile phone is associated with the mobile station and upon pressing and dialing one of a key on the mobile phone the mobile station communicates with an associated BTS on a Random Access Channel (RACH) for further communication with the MCR. The mobile phone is placed at a predefined distance towards the MCR prior to dialing the mobile phone.

During online transactions the mobile station requests the MCR through a Random Access Channel (RACH) for allocating a specific channel in order to send the unique mobile subscriber identification number to the MCR. Upon request by the mobile station the frequency meter sends frequency information, timing information and intensity information of the RACH to the CPU of the MCR. Upon receiving the frequency information, the timing information and the intensity information of the RACH by the CPU, the CPU adjusts frequency of the receiving unit in order to receive the request from the RACH. The MCR allocates a Stand Alone Dedicated Control Channel (SDCCH) to the mobile station based upon the request by the mobile station in order to receive the unique mobile subscriber identification number. The CPU allocates the SDCCH to the mobile station based on the continuously scanned communication wave information stored in the memory unit. The receiving unit reads the unique mobile subscriber identification number announced by the mobile station.

The MCR directs the mobile station to disconnect communication with the MCR, upon receiving the unique mobile subscriber identification number from the mobile station. The CPU co-ordinates with the transmitting unit to transmit the unique mobile subscriber identification number to the transaction unit. The CPU exchanges information in accordance with communication protocol among the receiving unit, the transmitting unit, the frequency meter and the memory unit. In various embodiments herein the MCR is one of a Mobile Phone Contactless IMSI (International Mobile Subscriber Identity) Reader (MCIR), a Mobile Phone Contactless TMSI (Temporary Mobile Subscriber Identity) Reader (MCTR), a Mobile Phone Contactless IMEI (International Mobile Equipment Identity) Reader (MCIMR), and a Mobile Phone Contactless MSISDN (Mobile Subscriber ISDN (Integrated Services Digital Network) Number) Reader (MCISDNR).

In various embodiments herein, the Universal Mobile Money (Ummoney) database is a single universal virtual account created independent of each bank and mobile phone operators. The universal virtual account is allocated to each of the mobile phone user. Mobile number of the each of the mobile phone is provided with a unique universal virtual account number for online electronic money transactions using the mobile phone/mobile banking methods/mobile payment services. Mobile phone subscribers of all operators (users) deposit money into the unique universal virtual account using alternate methods without having bank account or one or more of an electronic identity card and a credit card through the mobile phone across globe. Thereby the money deposited in the unique universal virtual account is used for purpose of online transactions. Examples of the online transactions include, but are not limited to purchasing, money deposition into third party's account, online shopping, paying bus or metro fare, receiving money from third party members, depositing money into third party account, Online purchasing/shopping, depositing money into individual or third party bank account, and withdrawing money from ATM machine.

The information related to a plurality of unique universal virtual account number associated with each individual country and credit amount associated with the plurality of the unique universal virtual account are stored in the Ummoney Center (Universal Mobile Money Center) of the designated individual country. The Ummoney center intermediates among plurality of mobile phone subscribers/users, various mobile phone operators and banks in each of the individual country and other Ummoney centers in other individual countries in the world. The banks in which universal accounts are opened are termed as Main Bank (MB). The MB connects with plurality of the banks for depositing and withdrawing money from the unique universal virtual account. Furthermore, due to the connection of the MB with plurality of banks one or more mobile phone subscribers/users can transfer money from unique universal virtual account to any other bank account.

FIG. 1 illustrates block diagram of a mobile phone 101 connected to a transaction unit 103 through a Mobile phone Contactless Reader (MCR) 102 for online mobile phone transactions according to an embodiment of the present disclosure. With respect to FIG. 1, the MCR 102 performs online transaction between the mobile phone and the transaction unit based on reception of a unique mobile subscriber identification number. The unique mobile subscriber identification number is associated with SIM card of the mobile phone 101 of user. The unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. Examples of the transaction unit 103 includes, but are not limited to a bank, an ATM, Bus ticket or an Taxi fare reader, a metro system, a Point of sale (POS) and Time and Attendance system. The transaction unit is in turn connected to one of a bank account database or a Universal Mobile Money (Ummoney) database for online mobile transactions. The bank account database or the Ummoney centre intermediates with subscriber of the mobile phone for successful mobile phone transactions.

The MCR according to the embodiments herein is employed in various application areas such as accessing various control devices, house and garage door opener, various remote controllers associated with alarm systems, vending machines, part meters, play cities, vending machines, taxi fare reader, mobile banking, mobile payment, cinema readers and the like.

Figure 2:
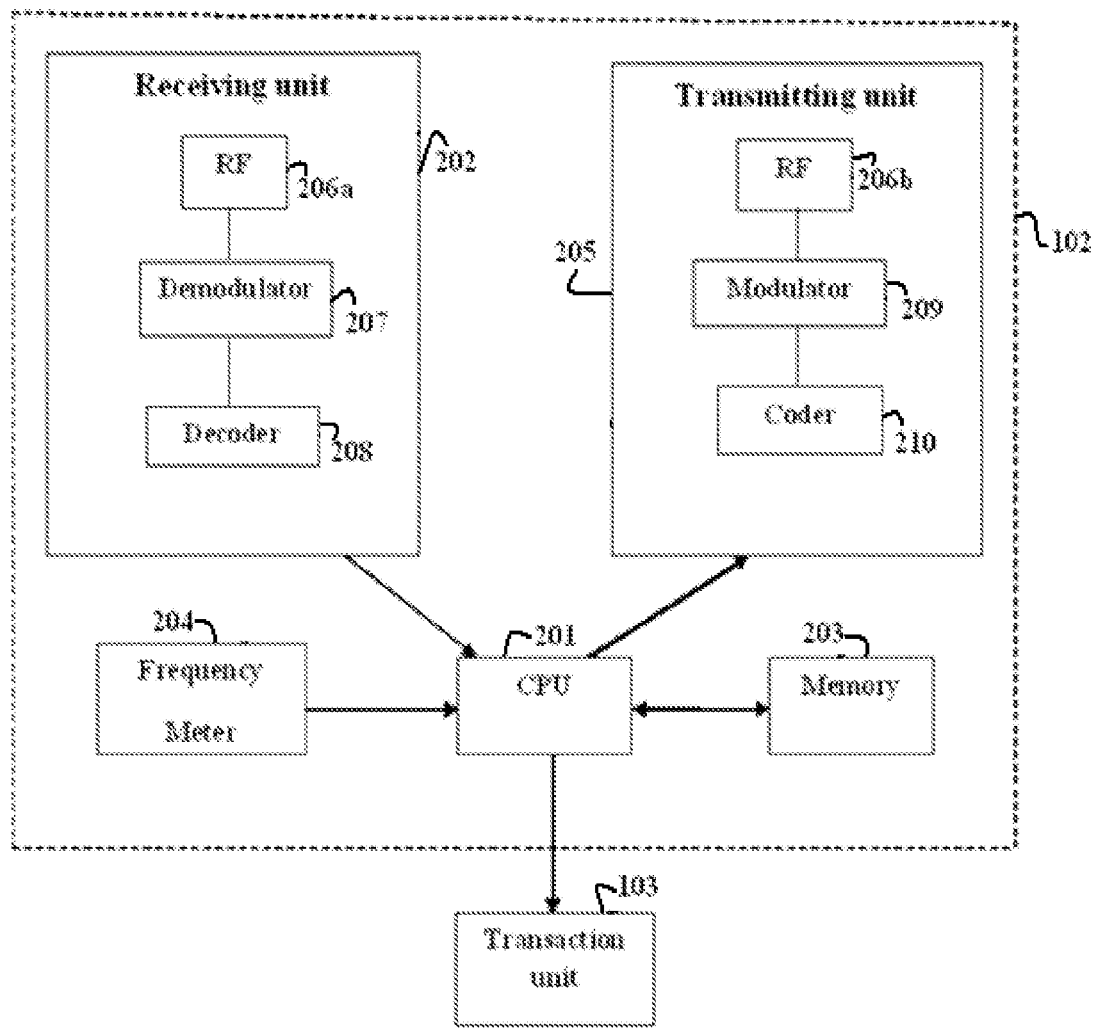
FIG. 2 is a block diagram illustrating various elements of a Mobile phone Contactless Reader (MCR) according to an embodiment of the present disclosure.

FIG. 2 illustrates various elements of a Mobile phone Contactless Reader (MCR) and the MCR connected to a transaction unit according to an embodiment of the present disclosure. With respect to the FIG. 2, the MCR 102 includes a Central Processing Unit (CPU) 201, a receiving unit 202 to continuously scan communication waves on a Broadcast Control Channel (BCCH). The communication waves are broadcasted by a Base Transceiver Station (BTS). The MCR also includes a memory unit 203 for storing and updating the continuously scanned communication waves. A frequency meter 204 is provided in the MCR for counting the scanned communication waves. Further the frequency meter measures frequency of the scanned proximal communication wave. The proximal communication wave is associated with a mobile station. The frequency meter is stimulated based on scanning of the proximal communication wave and the measured frequency of the proximal communication wave is communicated to the CPU 201. Further the MCR includes a transmitting unit 205 for transmitting one of a unique mobile subscriber identification number to a transaction unit during online mobile phone transactions. Upon request by the MCR 102, the mobile station announces the unique mobile subscriber identification number to the MCR. The announced unique mobile subscriber identification number is transferred to one of a bank account or a Universal Mobile Money (Ummoney) database through the transaction unit for online mobile transactions.

The frequency meter 204 is provided with logic circuit for counting the scanned communication waves and measuring frequency of the scanned proximal communication wave. According to one embodiment of the present disclosure herein, the unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone. The transaction unit 103 is associated with a payment service provider. The receiving unit 202 further consists of a Radio Frequency unit (RF) 206a a Demodulator 207 and a Decoder 208. The transmitting unit 205 further consists of a Radio Frequency unit 206b a Modulator 209 and a Coder 210. A mobile phone 101 (as shown in FIG. 1) is associated with the mobile station and upon pressing and dialing one of a key on the mobile phone the mobile station communicates with an associated BTS on a Random Access Channel (RACH) for further communication with the MCR. Prior to dialing one of the key, the mobile phone is placed at a predefined distance towards the MCR.

During online transactions the mobile station requests the MCR through a Random Access Channel (RACH) for allocating a specific channel (For example the mobile station reports to the MCR saying I am number five and allocate me one SDCCH) in order to send the unique mobile subscriber identification number to the MCR. Upon request by the mobile station, the frequency meter sends frequency information, timing information and intensity information of the RACH to the CPU of the MCR. Upon receiving the frequency information, the timing information and the intensity information of the RACH by the CPU, the CPU adjusts frequency of the receiving unit in order to receive the request from the RACH. The MCR allocates a Stand Alone Dedicated Control Channel (SDCCH) (For example the MCR reports to the mobile station saying number five go to SDCCH channel) to the mobile station based upon the request by the mobile station to receive the unique mobile subscriber identification number. The CPU allocates the SDCCH to the mobile station based on the continuously scanned communication wave information stored in the memory unit. The receiving unit reads the unique mobile subscriber identification number announced by the mobile station.

The MCR directs the mobile station to disconnect communication with the MCR, upon receiving the unique mobile subscriber identification number from the mobile station. The CPU is in coordination with the transmitting unit to transmit the unique mobile subscriber identification number to the transaction unit. The CPU is in coordination with the receiving unit, the transmitting unit, the frequency meter and the CPU exchanges information in accordance with communication protocol among the receiving unit, the transmitting unit, the frequency meter and the memory unit. In various embodiments herein, the MCR is one of a Mobile Phone Contactless IMSI (International Mobile Subscriber Identity) Reader (MCIR), a Mobile Phone Contactless TMSI (Temporary Mobile Subscriber Identity) Reader (MCTR), a Mobile Phone Contactless IMEI (International Mobile Equipment Identity) Reader (MCIMR), and a Mobile Phone Contactless MSISDN (Mobile Subscriber ISDN (Integrated Services Digital Network) Number) Reader (MCISDNR).

Figure 3:
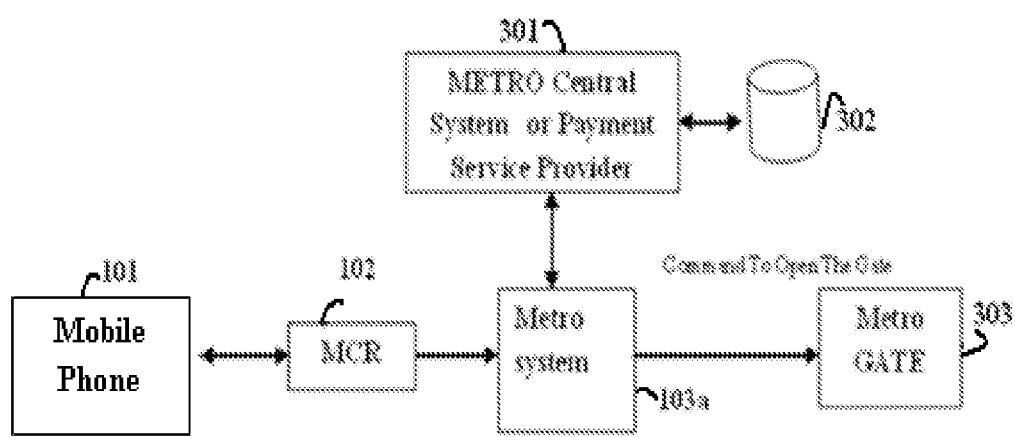
FIG. 3 is an exemplary illustration of a mobile phone in communication with a metro system through a Mobile phone Contactless Reader (MCR) for online mobile phone transaction according to an embodiment of the present disclosure.

FIG. 3 is an exemplary illustration of a mobile phone 101 in communication with a metro system 103a through a Mobile phone Contactless Reader (MCR) 102 for online mobile phone transaction according to an embodiment of the present disclosure. With respect to FIG. 3, the mobile phone 101 is placed within 30 cm towards the MCR during online transactions between the mobile phone 101 and the metro system 103a. One of a key is pressed and dialed using the mobile phone in order to initiate communication between the mobile phone and the MCR. Further, following the dialing action, the MCR 102 receives a unique mobile subscriber identification number of the mobile phone. The unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone.

The received unique mobile subscriber identification number is transferred to the metro system 103a for opening the metro gate 303 using mobile phone transaction. The metro system which is in turn connected to a metro central system or a payment service provider 301 is associated with the metro system 103a. The metro system transfers the received unique mobile subscriber identification number to the metro central system or a payment service provider 301. The metro system transfers the received unique mobile subscriber identification number for mapping details stored in database 302 for mobile phone subscriber/user authentication. Following with positive authentication of the mobile phone subscriber/user, the metro system 103a provides command to open the metro gate 303. Examples of the details with respect to which the positive authentication is carried out includes but are not limited to the IMSI number, personal details of the subscriber/user of the mobile phone, profile details of the subscriber/user of the mobile phone, SIM card number of the subscriber/user of the mobile phone, bank account details of the subscriber/user of the mobile phone, and Ummoney account details of the subscriber/user of the mobile phone.

Figure 4:
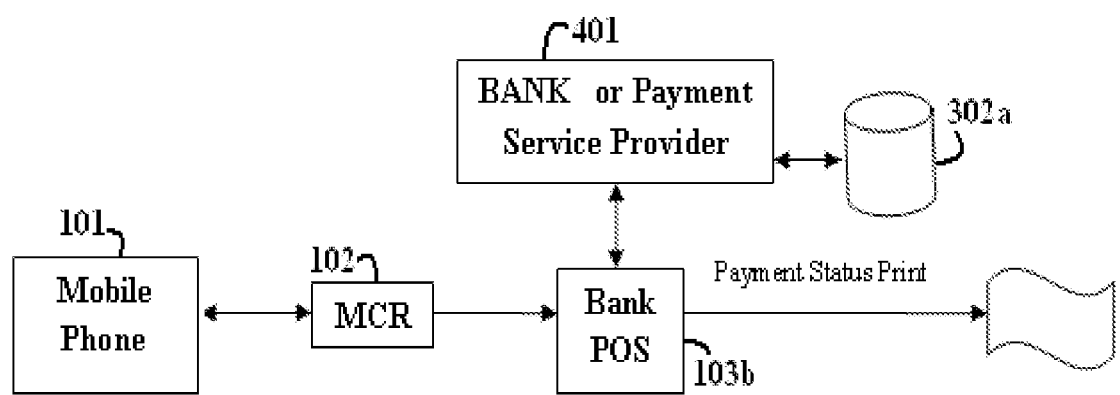
FIG. 4 is an exemplary illustration of a mobile phone in communication with a Bank Point of sale (POS) system through a Mobile phone Contactless Reader (MCR) for online mobile phone transaction according to an embodiment of the present disclosure.

FIG. 4 is an exemplary illustration of a mobile phone 101 in communication with a Bank Point of sale (POS) system 103b through a Mobile phone Contactless Reader (MCR) 102 for online mobile phone transaction according to an embodiment of the present disclosure. With respect to FIG. 4, during online transaction between the mobile phone 101 and the Bank POS 103b, the mobile phone 101 is placed within 30 cm towards the MCR. One of a key is pressed and dialed using the mobile phone in order to initiate communication between the mobile phone and the MCR. Further, following the dialing action, the MCR 102 receives a unique mobile subscriber identification number associated with the mobile phone 101. The unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone.

The received unique mobile subscriber identification number is transferred to the Bank POS 103b for online bank payments using mobile phone transaction. The metro system which is in turn connected to a Bank or a payment service provider 401 is associated with the Bank POS 103b. The Bank POS 103b transfers the received unique mobile subscriber identification number to a Bank or a payment service provider 401. The Bank POS 103b transfers the received unique mobile subscriber identification number for mapping details stored in database 302a for mobile phone subscriber/user authentication. Following with positive authentication of the mobile phone subscriber/user and successful payment by the bank or the payment service provider 401a payment status is displayed on the MCR 102. Also the payment status print is provided at the end of the Bank POS 103b to the mobile phone subscriber/user. Examples of the details with respect to which the positive authentication is carried out includes but are not limited to the IMSI number, personal details of the subscriber/user of the mobile phone, profile details of the subscriber/user of the mobile phone, SIM card number of the subscriber/user of the mobile phone, bank account details of the subscriber/user of the mobile phone, and Ummoney account details of the subscriber/user of the mobile phone.

Figure 5:
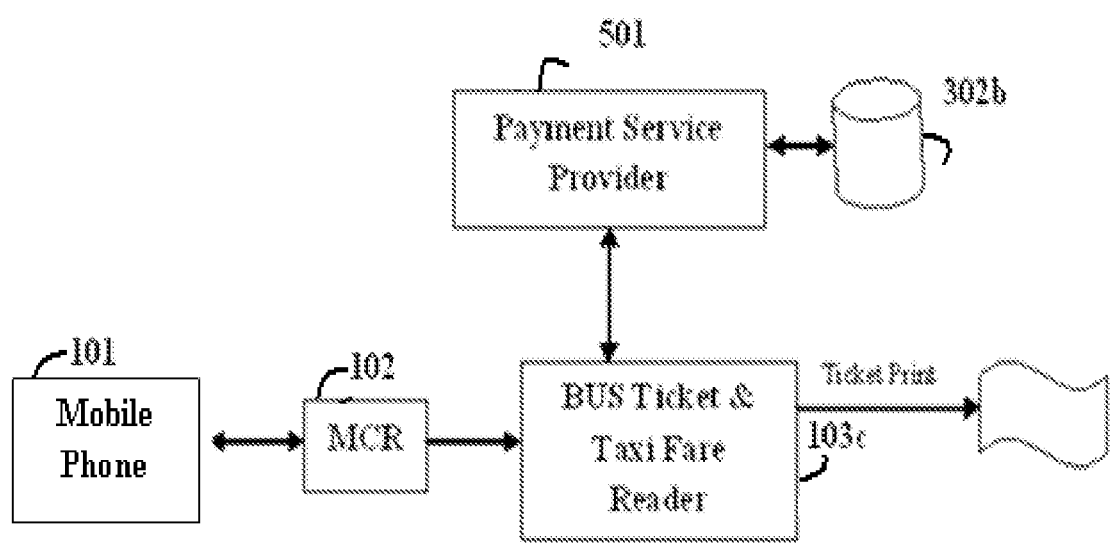
FIG. 5 is an exemplary illustration of a mobile phone in communication with one of a Bus ticket and a Taxi fare reader through a Mobile phone Contactless Reader (MCR) for online mobile phone transaction according to an embodiment of the present disclosure.

FIG. 5 is an exemplary illustration of a mobile phone 101 in communication with one of a Bus ticket or a Taxi fare reader 103c through a Mobile phone Contactless Reader (MCR) 102 for online mobile phone transaction according to an embodiment of the present disclosure. With respect to FIG. 5, during online transaction between the mobile phone 101 and the Bus ticket/taxi fare reader 103c the mobile phone 101 is placed within 30 cm towards the MCR 102. One of a key is pressed and dialed using the mobile phone in order to initiate communication between the mobile phone 101 and the MCR 102. Further, following the dialing action, the MCR 102 receives a unique mobile subscriber identification number associated with the mobile phone 101. The unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone 101.

The received unique mobile subscriber identification number is transferred to Bus ticket/taxi fare reader 103c for online payment of the bus fare or the taxi fare using mobile phone transaction. Bus ticket/taxi fare reader 103c which is in turn connected to a Bank or a payment service provider 501 is associated with the Bus ticket/taxi fare reader 103c. The Bus ticket/taxi fare reader 103c transfers the received unique mobile subscriber identification number to a Bank or a payment service provider 501. The Bus ticket/taxi fare reader 103c transfers the received unique mobile subscriber identification number for mapping details stored in database 302b for mobile phone subscriber/user authentication. Following with positive authentication of the mobile phone subscriber/user and successful payment by the bank or the payment service provider 501a payment status is displayed on the MCR 102. Also the payment status print is provided at the end of the Bus ticket/taxi fare reader 103c to the mobile phone subscriber/user. Examples of the details with respect to which the positive authentication is carried out includes but are not limited to the IMSI number, personal details of the subscriber/user of the mobile phone, profile details of the subscriber/user of the mobile phone, SIM card number of the subscriber/user of the mobile phone, bank account details of the subscriber/user of the mobile phone, and Ummoney account details of the subscriber/user of the mobile phone.

Figure 6:
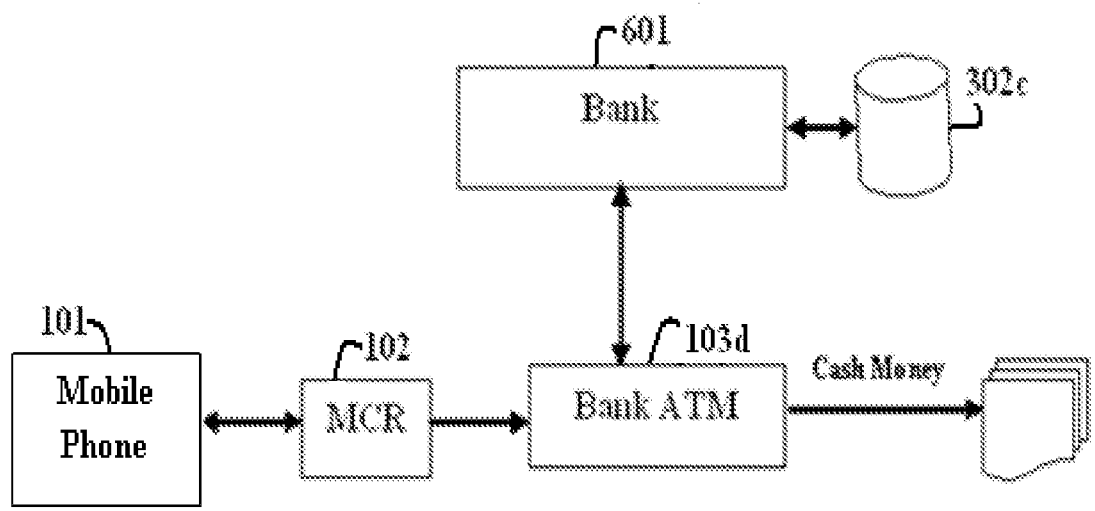
FIG. 6 is an exemplary illustration of a mobile phone in communication with a Bank ATM through a Mobile phone Contactless Reader (MCR) for online mobile phone transaction according to an embodiment of the present disclosure.

FIG. 6 is an exemplary illustration of a mobile phone 101 in communication with Bank ATM 103d through a Mobile phone Contactless Reader (MCR) 102 for online mobile phone transaction according to an embodiment of the present disclosure. With respect to FIG. 6 during online transaction between the mobile phone 101 and the Bank ATM 103c the mobile phone 101 is placed within 30 cm towards the MCR 102. One of a key is pressed and dialed using the mobile phone in order to initiate communication between the mobile phone 101 and the MCR 102. Further, following the dialing action, the MCR 102 receives a unique mobile subscriber identification number associated with the mobile phone 101. The unique mobile subscriber identification number includes one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number. The unique mobile subscriber identification number is associated with Subscriber Identity Module (SIM) card of the mobile phone 101.

The received unique mobile subscriber identification number is transferred to Bank ATM 103d for withdrawing cash from the Bank ATM 103d using mobile phone transaction. Bank ATM 103d which is in turn connected to a Bank or a payment service provider 601 is associated with the Bank ATM 103*d*. The Bank ATM 103*d* transfers the received unique mobile subscriber identification number to a Bank or a payment service provider 601. The Bank ATM 103*d* transfers the received unique mobile subscriber identification number for mapping details stored in database 302*c* for mobile phone subscriber/user authentication. Following with positive authentication of the mobile phone subscriber/user and successful payment by the bank or the payment service provider 601 the cash is accepted by the subscriber/user of the mobile phone 101. Also the cash withdrawn by the subscriber/user is displayed on the display unit of the MCR 102. Examples of the details with respect to which the positive authentication is carried out includes but are not limited to the IMSI number, personal details of the subscriber/user of the mobile phone, profile details of the subscriber/user of the mobile phone, SIM card number of the subscriber/user of the mobile phone, bank account details of the subscriber/user of the mobile phone, and Ummoney account details of the subscriber/user of the mobile phone.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A Mobile phone Contactless Reader (MCR), the MCR comprising:
   a Central Processing Unit (CPU);
   a receiving unit to scan communication waves on a Broadcast Control Channel (BCCH) broadcasted by a Base Transceiver Station (BTS);
   a memory unit to store and update the continuously scanned communication waves;
   a frequency meter to count the scanned communication waves and measure a frequency of a proximal communication wave, wherein the proximal communication wave is associated with a mobile station; and
   a transmitting unit for transmitting one of a unique mobile subscriber identification number to a transaction unit,
   wherein the mobile station provides the unique mobile subscriber identification number to the MCR where the unique mobile subscriber identification number is transferred to one of a bank account and a Universal Mobile Money (Ummoney) database through the transaction unit for online mobile transactions,
   wherein the mobile station requests the MCR through a Random Access Channel (RACH) for allocating a channel to transmit the unique mobile subscriber identification number to the MCR, and
   wherein the frequency meter is adapted to send frequency information, timing information and intensity information of the RACH to the CPU upon a second request by the mobile station.

2. The MCR of claim 1, wherein the frequency meter is adapted to communicate the measured frequency to the CPU on receiving stimulation from the scanned proximal communication wave.

3. The MCR of claim 1, wherein the unique mobile subscriber identification number comprises at least one of an IMSI (International Mobile Subscriber Identity) number, a TMSI (Temporary Mobile Subscriber Identity) number, an IMEI (International Mobile Equipment Identity) number and a MSISDN (Mobile Subscriber Integrated Services Digital Network) number.

4. The MCR of claim 1, wherein the frequency meter includes a logic circuit to count the scanned communication waves and measure frequency of the proximal communication wave.

5. The MCR of claim 1, wherein the transaction unit is associated with a payment service provider.

6. The MCR of claim 1, wherein a mobile phone is associated with the mobile station is adapted to communicate with an associated BTS on a Random Access Channel (RACH) for communication with the MCR.

7. The MCR of claim 6, wherein the mobile phone is placed at a predefined distance towards the MCR before activating the mobile phone.

8. The MCR of claim 1, wherein the unique mobile subscriber identification number is associated with Subscriber Identity Module (SIM) card of the mobile phone.

9. The MCR of claim 1, wherein the CPU adjusts frequency of the receiving unit to receive the request from the RACH upon receiving the frequency information, the timing information and the intensity information of the RACH by the CPU.

10. The MCR of claim 9, wherein the MCR allocates a Stand Alone Dedicated Control Channel (SDCCH) to the mobile station based upon the request by the mobile station in order to receive the unique mobile subscriber identification number.

11. The MCR of claim 10, wherein the CPU allocates the SDCCH to the mobile station based on the continuously scanned communication wave information stored in the memory unit.

12. The MCR of claim 1, wherein the receiving unit further comprising: a Radio Frequency unit (RF); a Demodulator; and a Decoder.

13. The MCR of claim 1, wherein the transmitting unit further comprising: a Radio Frequency unit (RF); a Modulator; and a Coder.

14. The MCR of claim 1, the MCR directs the mobile station to disconnect communication with the MCR, upon receiving the unique mobile subscriber identification number from the mobile station.

15. The MCR of claim 1, wherein the CPU is in coordination with the receiving unit, the transmitting unit, the frequency meter and the CPU exchanges information in accordance with communication protocol among the receiving unit, the transmitting unit, the frequency meter and the memory unit during online mobile transaction.

16. The MCR of claim 1, wherein the CPU is in coordination with the transmitting unit to transmit the unique mobile subscriber identification number to the transaction unit.

17. The MCR of claim 1, wherein the MCR is one of a Mobile Phone Contactless IMSI (International Mobile Subscriber Identity) Reader (MCIR), a Mobile Phone Contactless TMSI (Temporary Mobile Subscriber Identity) Reader (MCTR), a Mobile Phone Contactless IMEI (International Mobile Equipment Identity) Reader (MCIMR), and a Mobile Phone Contactless MSISDN (Mobile Subscriber ISDN (Integrated Services Digital Network) Number) Reader (MCISDNR).

* * * * *